United States Patent
Cho et al.

(10) Patent No.: US 9,467,927 B2
(45) Date of Patent: Oct. 11, 2016

(54) METHOD AND APPARATUS FOR GENERATING ALLOWED LIST BASED ON REGIONS FOR WIRELESS TERMINAL IN COMMUNICATION SYSTEM

(75) Inventors: Song Yean Cho, Seoul (KR); Chae Gwon Lim, Seoul (KR); Han Na Lim, Seoul (KR); Sung Ho Choi, Suwon-si (KR); Beom Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 13/511,514

(22) PCT Filed: Nov. 23, 2010

(86) PCT No.: PCT/KR2010/008270
§ 371 (c)(1),
(2), (4) Date: May 23, 2012

(87) PCT Pub. No.: WO2011/065718
PCT Pub. Date: Jun. 3, 2011

(65) Prior Publication Data
US 2013/0003656 A1 Jan. 3, 2013

(30) Foreign Application Priority Data
Nov. 26, 2009 (KR) .................. 10-2009-0115328

(51) Int. Cl.
*H04W 48/04* (2009.01)
*H04W 4/00* (2009.01)
*H04W 48/08* (2009.01)
*H04W 74/00* (2009.01)

(52) U.S. Cl.
CPC ............ *H04W 48/04* (2013.01); *H04W 4/005* (2013.01); *H04W 48/08* (2013.01); *H04W 74/004* (2013.01)

(58) Field of Classification Search
USPC .............................................. 370/328
See application file for complete search history.

(56) References Cited

U.S. PATENT DOCUMENTS

| 8,520,594 | B2* | 8/2013 | Gupta et al. .................. 370/328 |
| 8,533,345 | B2* | 9/2013 | Fedotenko .................... 709/228 |
| 8,626,162 | B2* | 1/2014 | Deshpande et al. ....... 455/435.1 |
| 2007/0220005 | A1* | 9/2007 | Castro Castro et al. ......... 707/9 |
| 2008/0064411 | A1 | 3/2008 | Kim |
| 2008/0194235 | A1* | 8/2008 | Dalsgaard et al. ........... 455/411 |

(Continued)

FOREIGN PATENT DOCUMENTS

| EP | 2190243 A1 * | 5/2010 |
| KR | 10-2006-0024984 A | 3/2006 |

(Continued)

*Primary Examiner* — Hassan Kizou
*Assistant Examiner* — Deepa Belur
(74) *Attorney, Agent, or Firm* — Jefferson IP Law, LLP

(57) ABSTRACT

A method and system for generating an allowed list based on regions for a wireless terminal are disclosed. The method generates an allowed list based on regions to control network access of a stationary wireless terminal, and includes: sending, by the wireless terminal, an attach request to a network; creating, by the network, an allowed list that contains information on regions in which the wireless terminal is permitted to access the network; and controlling, by the network, network access of the wireless terminal on the basis of the allowed list. Hence, the allowed list, which stores information regarding regions in which the MTC terminal 110 is permitted to access the network, may be dynamically created by the terminal or the MME.

22 Claims, 8 Drawing Sheets

(56) References Cited

U.S. PATENT DOCUMENTS

| | | | |
|---|---|---|---|
| 2009/0047951 A1* | 2/2009 | Yeoum | H04W 8/06 455/435.1 |
| 2009/0094680 A1* | 4/2009 | Gupta et al. | 726/3 |
| 2009/0288139 A1* | 11/2009 | Huber et al. | 726/2 |
| 2009/0305699 A1* | 12/2009 | Deshpande et al. | 455/434 |
| 2010/0197307 A1* | 8/2010 | Horn | H04W 60/02 455/435.1 |
| 2010/0272004 A1* | 10/2010 | Maeda | H04L 5/0007 370/312 |
| 2011/0165878 A1* | 7/2011 | Nylander et al. | 455/436 |
| 2011/0223887 A1* | 9/2011 | Rune et al. | 455/411 |
| 2011/0274046 A1* | 11/2011 | Rune et al. | 370/328 |
| 2011/0281584 A1* | 11/2011 | Sander et al. | 455/436 |
| 2012/0088505 A1* | 4/2012 | Toh et al. | 455/434 |
| 2014/0095715 A1* | 4/2014 | Kawamoto et al. | 709/225 |
| 2014/0185604 A1* | 7/2014 | Kil et al. | 370/338 |
| 2014/0273972 A1* | 9/2014 | Butler et al. | 455/411 |

FOREIGN PATENT DOCUMENTS

| | | |
|---|---|---|
| KR | 10-0858282 B1 | 9/2008 |
| WO | WO 2011123824 A1 * | 10/2011 |

* cited by examiner

METHOD AND APPARATUS FOR GENERATING ALLOWED LIST BASED ON REGIONS FOR WIRELESS TERMINAL IN COMMUNICATION SYSTEM

TECHNICAL FIELD

The present invention relates to generation of an allowed list based on regions for a wireless terminal in a communication system and, more particularly, to a method and apparatus that dynamically generate and update an allowed list for controlling network access of a stationary wireless terminal in a communication system.

BACKGROUND ART

Machine-type communication (MTC) refers to communication technology for stationary or low-mobility terminals, unlike mobile communication where mobility must be addressed. MTC may serve various terminals or devices, such as vending machines installed at specific locations, household appliances used in homes, and security cameras installed at fixed locations for security.

Typical MTC devices are fixed or have low mobility. Hence, it is possible to simplify network procedures related to access signaling and control signal transmission. In addition, when it is necessary for the network to page a particular MTC device, the network has to page the MTC device only in a specific region. Thus, the network may easily control the MTC device.

DISCLOSURE OF INVENTION

Technical Problem

Access control based on regions is necessary for an MTC device to access a desired network. However, at the time of initial deployment, it may be difficult to determine the actual deployment location of the MTC device and which base station of the network operator from which the MTC device receives a service.

Accordingly, it is necessary to develop a method for dynamically generating an allowed list based on regions that enables an MTC device to access a legitimate network regardless of deployment time or deployment location.

Solution to Problem

The present invention has been made in view of the above problems, and the present invention provides a method and system that dynamically generate and update an allowed list for controlling network access of a stationary wireless terminal.

In accordance with an exemplary embodiment of the present invention, there is provided a method for generating an allowed list based on regions to control network access of a stationary wireless terminal, including: sending, by the wireless terminal, an attach request to a network; creating, by the network, an allowed list that contains information on regions in which the wireless terminal is permitted to access the network; and controlling, by the network, network access of the wireless terminal on the basis of the allowed list.

In accordance with another exemplary embodiment of the present invention, there is provided a stationary wireless terminal including: a storage unit storing an allowed list that contains information on regions in which the wireless terminal is permitted to access the network; a control unit collecting, when the allowed list is initialized at the time of network attachment, information on available cells for a preset time, and creating a cell list in order of cell signal strength; and a wireless communication unit sending the created cell list to the network.

In accordance with another exemplary embodiment of the present invention, there is provided an MME including: a wireless communication unit receiving a control signal from a wireless terminal; a control unit creating, upon reception of an attach request from a wireless terminal, an allowed list that contains information on regions at which the wireless terminal is permitted to access the network, and controlling network access of the wireless terminal on the basis of the allowed list; and a storage unit storing the allowed list.

In accordance with another exemplary embodiment of the present invention, there is provided a system for generating an allowed list based on regions to control network access, including: a stationary wireless terminal sending an attach request; and a network creating, upon reception of the attach request, an allowed list that contains information on regions at which the wireless terminal is permitted to access the network, and controlling network access of the wireless terminal on the basis of the allowed list.

In a feature of the present invention, the mobility management entity (MME) may generate an allowed list, which stores information regarding regions in which an MTC terminal is allowed to access the network, dynamically or on the basis of information provided by the MTC terminal. Hence, it is not necessary to set up an allowed list before initial attachment or initial deployment of the MTC terminal. In the case of movement of the MTC terminal or cell rearrangement, it is possible to dynamically manage the allowed list by updating the allowed list.

Advantageous Effects of Invention

According to the present invention, the allowed list, which stores information regarding regions at which the MTC terminal is permitted to access the network, may be dynamically created by the MTC terminal or the MME.

BRIEF DESCRIPTION OF DRAWINGS

The features and advantages of the present invention will be more apparent from the following detailed description in conjunction with the accompanying drawings, in which.

MODE FOR THE INVENTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

In the description, the terms "wireless terminal", "user equipment" (UE), "MTC device" and "MTC terminal" may be used interchangeably.

Figure 1:
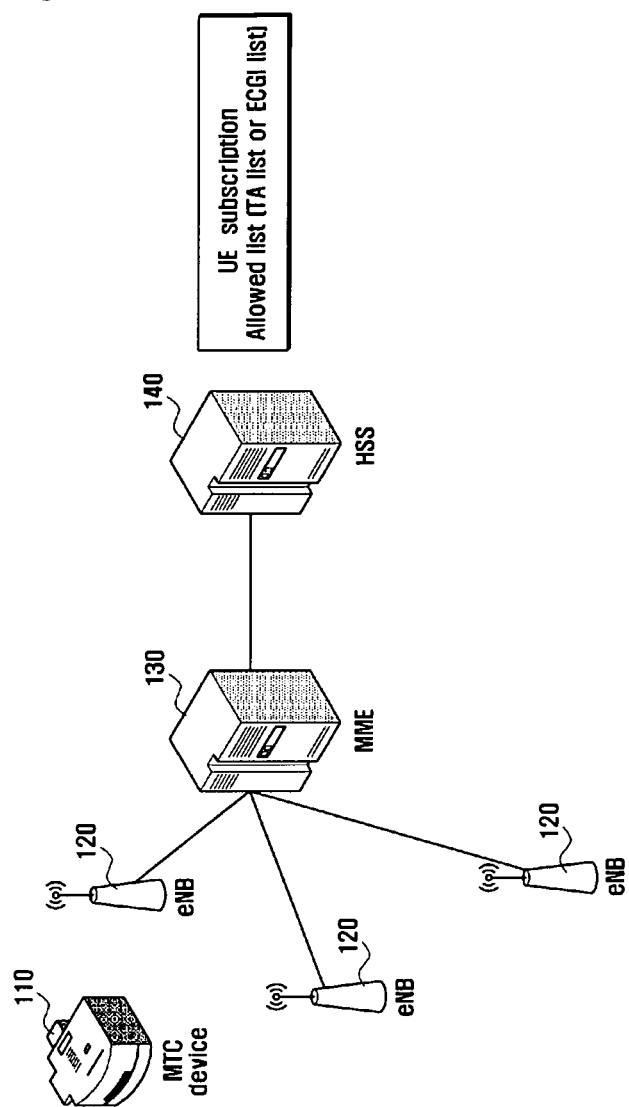
FIG. 1 illustrates a network architecture for static region-based access control of an MTC terminal using an allowed list according to the related art.

FIG. 1 illustrates a network architecture for static region-based access control of an MTC terminal using an allowed list according to the related art.

The network controls the network access operation of the MTC terminal 110 (or MTC device) so that the MTC terminal 110 can access the network only at preset regions. To achieve this, the network stores a list of regions, at which the MTC terminal 110 is allowed to access the network, as an allowed list. The network performs static access control based on regions for the MTC terminal 110 by accepting or rejecting an attach request from the MTC terminal 110 by means of the allowed list.

To be more specific, in FIG. 1, the MTC terminal 110 is a stationary device with a fixed location. To access the network, the MTC terminal 110 may connect to an eNB 120 (a base station) covering the region at which the MTC terminal 110 is located.

The eNB 120 provides communication services to mobile or stationary terminals present in its coverage area. In particular, the eNB 120 relays signaling and control messages between the MTC terminal 110 and the network.

The mobility management entity (MME) 130 manages terminals in the idle state, and selects a serving gateway and a packet data network (PDN) gateway (not shown). The MME 130 also performs operations needed for roaming and authentication.

The home subscriber server (HSS) 140 manages information regarding subscribers to the network using a subscription list. In particular, the HSS 140 stores information on regions, at which the MTC terminal 110 is allowed to access the network, as an allowed list. When the MTC terminal 110 issues an attach request, the HSS 140 sends the subscription information and allowed list of the MTC terminal 110 to the MME 130. The MME 130 accepts or rejects the attach request from the MTC terminal 110 on the basis of the allowed list from the HSS 140 and the region at which the MTC terminal 110 wishes to access the network.

Figure 2:
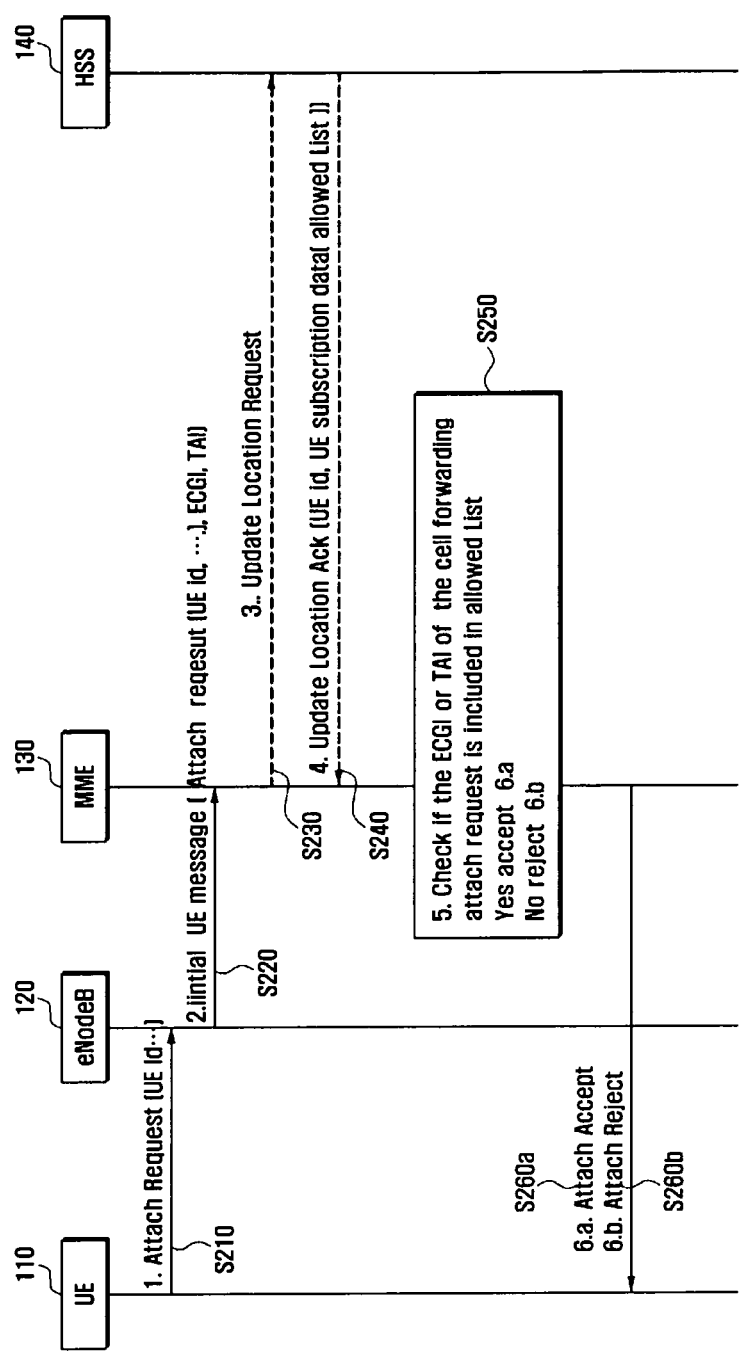
FIG. 2 is a sequence diagram illustrating a network procedure for accepting or rejecting an attach request from an MTC terminal on the basis of an allowed list according to the related art.

FIG. 2 is a sequence diagram illustrating a network procedure for accepting or rejecting an attach request from an MTC terminal on the basis of an allowed list according to the related art.

Referring to FIG. 2, for network access, the MTC terminal 110 (or a user equipment (UE)) sends an attach request to the serving eNB 120 (S210). The attach request may contain the terminal identifier (UE id) of the requesting MTC terminal 110.

The eNB 120 creates an initial UE message that contains the attach request received from the MTC terminal 110 and ECGI (E-UTRAN cell global identifier) and TAI (tracking area ID) of the eNB 120, and sends the initial UE message to the MME 130 (S220).

The MME 130 checks for the presence of context information of the MTC terminal 110. If context information for the MTC terminal 110 is not present, the MME 130 sends an update location request to the HSS 140 (S230). In return, the HSS 140 sends an update location acknowledgement containing the allowed list of the MTC terminal 110 to the MME 130 (S240).

Thereafter, the MME 130 determines whether the ECGI (or global cell ID) or tracking area is contained in the allowed list received from the HSS 140 (S250). Here, the ECGI or tracking area indicates the location of the MTC terminal 110. When the location of the MTC terminal 110 is contained in the allowed list, the MME 130 accepts the attach request by sending an attach accept message to the MTC terminal 110 (S260a). When the location of the MTC terminal 110 is not contained in the allowed list, the MME 130 rejects the attach request by sending an attach reject message to the MTC terminal 110 (S260b).

The network operations described in FIG. 2 are applied not only to initial attachment of the terminal but also to tracking area update. Hence, a tracking area update request of the MTC terminal 110 may be accepted or rejected according to the location from which the request was transmitted.

As described above, in an existing access control method, the HSS 140 is assumed to have the allowed list of the MTC terminal 110. However, it may be extremely difficult to determine the actual deployment location of a stationary MTC terminal and to determine which eNB of the network operator the stationary MTC terminal receives a service after deployment. Hence, it may be difficult to setup the allowed list for an MTC terminal in advance at the time of manufacturing or initial deployment of the MTC terminal.

In addition, to search a serving cell using only an address of a house or building at which an MTC terminal 110 is deployed, the cell information database may have to contain information regarding combinations of neighbor cells. The address of a house or building may not be sufficient location information for networking. Hence, the allowed list estimated using the database is very likely to be inconsistent with the allowed list containing information on cells detected by the MTC terminal 110.

Further, when cells are rearranged due to network reconfiguration by the operator, manual adjustment of allowed lists of the MTC terminals 110 affected by cell rearrangement may be necessary in subscription information.

To solve the above problems, the present invention provides a method that dynamically controls network access of a stationary MTC terminal. More specifically, in the present invention, the allowed list is dynamically created according to the deployment site of a corresponding MTC terminal 110 (namely, based on regions). In addition, the allowed list may be periodically updated through tracking area update in the case of a change in the deployment site after initial deployment of the MTC terminal 110.

In the present invention, terminals are assumed to be stationary. Such a terminal may be originally stationary or be a mobile device that is reconfigured to be used as a stationary one. When a mobile device is reconfigured to be used as a stationary terminal, both the device and the network need to be aware of such reconfiguration.

This can be handled in two ways. First, when the user sets a mobile terminal as a stationary one, the terminal may send an attach request containing an indicator for stationary setting to the eNB. The eNB may recognize the terminal as a stationary one by means of the indicator.

Second, when control information from a terminal is received via an eNB with the same identifier such as the ECGI for a preset time, the MME may identify the terminal as being stationary.

Hereinafter, a description is given of a first embodiment and second embodiments that differ in the entity creating the allowed list. The first embodiment is a terminal-based solution, where the MTC terminal 110 provides information needed for the allowed list to the MME 130 and the MME 130 creates the allowed list and sends the created allowed list to the HSS 140. The second embodiment is a network-based solution in which the MME 130 dynamically creates the allowed list and sends the created allowed list to the HSS 140.

First Embodiment

In the first embodiment, the MTC terminal 110 provides information needed for the allowed list, and the MME 130 creates the allowed list and sends the created allowed list to the HSS 140.

Figure 3:
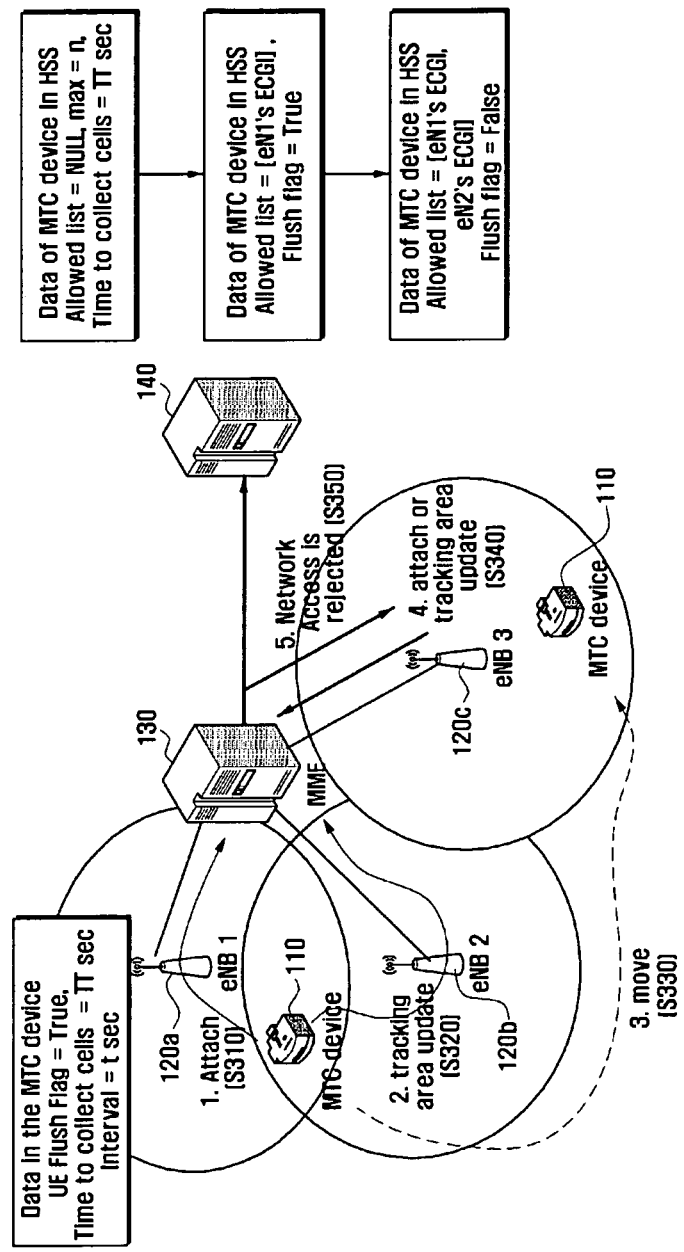
FIG. 3 is a diagram depicting an access control method using an allowed list created by an MTC terminal according to a first embodiment of the present invention.

FIG. 3 is a diagram depicting an access control method using an allowed list created according to the first embodiment of the present invention.

Initially, the MTC terminal 110 (or MTC device) may have information items for creating the allowed list, such as network detachment indication (UE Flush Flag=True), the time to collect information on neighbor cells available at initial attachment (t), and the tracking area update time (TT).

The HSS 140 may store information items for creating the allowed list, such as an empty allowed-list indication (Allowed List=NULL), the maximum permitted number of cells in the allowed list (max), and the tracking area update time (TT), in the subscription information.

Before initial attachment or initial deployment of the MTC terminal 110, the HSS 140 sets the allowed list to 'NULL' and records the maximum permitted number of cells in the allowed list (max) in the subscription information.

When the MTC terminal 110 is booted for the first time, it collects information on available cells up to the maximum number of cells (max) for a preset time t, creates a list of the available cells (ECGI list), and sends the ECGI list to the MME 130 (S310). The MME 130 creates the allowed list using the ECGI list and preset rules and sends the allowed list to the MTC terminal 110 and the HSS 140, which then store the received allowed list. When the MTC terminal 110 is moved to another site, the allowed list is updated through tracking area update (S320).

The MME 130 and HSS 140 perform access control for the MTC terminal 110 by means of the allowed list created and updated according to the above procedure.

If the MTC terminal 110 is unexpectedly moved to another location (S330), when the MTC terminal 110 makes an attach request or attempts to perform tracking area update (S340), network access is rejected (S350) because the new location of the MTC terminal 110 has not been reflected in the allowed list.

Figure 4:
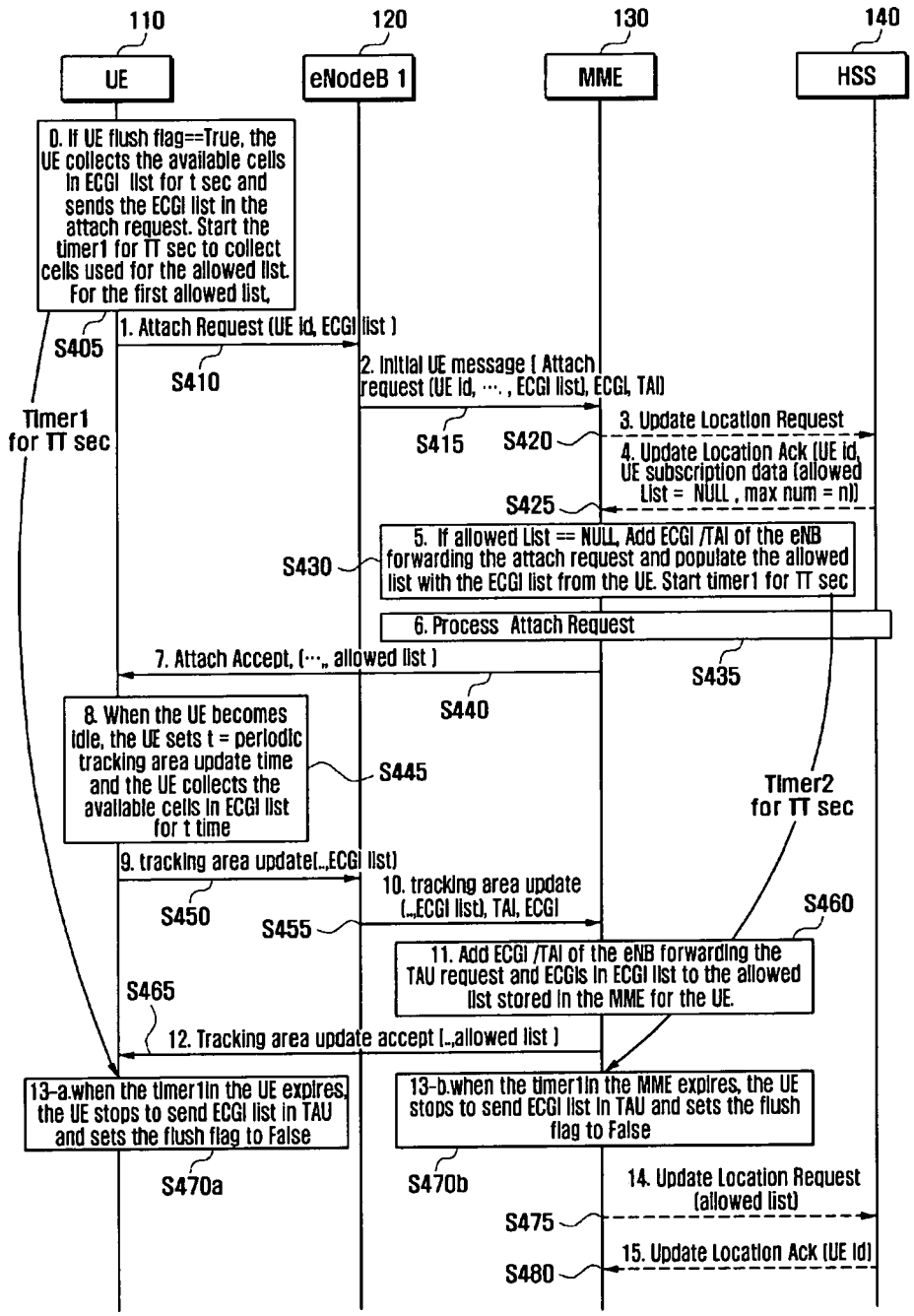
FIG. 4 is a sequence diagram illustrating a procedure by which the MTC terminal creates a cell list, sends the same to the HSS, and updates the created allowed list according to the embodiment of FIG. 3.

FIG. 4 is a sequence diagram illustrating a procedure by which the MTC terminal 110 creates a cell list, sends the same to the HSS 140, and updates the created allowed list according to the first embodiment.

Referring to FIG. 4, the MTC terminal 110 checks whether it is detached from the network (flush flag=true) (S405). Upon detaching from the network, the MTC terminal 110 collects information on available cells for a preset time t and creates a list of the available cells (ECGI list) arranged in order of signal strength. At the same time, the MTC terminal 110 starts a first timer running for a preset time TT. During the time TT, the MTC terminal 110, the MME 130 and the HSS 140 create an allowed list through network attachment and tracking area update.

For network access, the MTC terminal 110 sends an attach request to the eNB 120 (S410). Here, the attach request contains the identifier of the MTC terminal 110 and the ECGI list created at step S405.

The eNB 120 creates an initial UE message and sends the same to the MME 130 (S415). Here, the initial UE message may contain the attach request from the MTC terminal 110, and the identifier (ECGI) and TAI of the cell forwarding the attach request.

Upon reception of the initial UE message from the eNB 120, the MME 130 sends a request for subscription information of the MTC terminal 110 to the HSS 140 (S420). In return, the HSS 140 sends the initialized allowed list (allowed list=NULL) to the MME 130 (S425).

When the received allowed list is empty or initialized, the MME 130 adds first the ECGI of the cell having transmitted the attach request to the allowed list (S430). This serves to secure network access for the MTC terminal 110 requesting initial attachment. Next, the MME 130 adds items (i.e., ECGIs) from the ECGI list to the allowed list up to the maximum permitted number of cells set in the subscription information. The MME 130 starts a second timer running for the preset time TT. Until the second timer expires, the MME 130 completes generation of the allowed list. The duration of the first timer may equal that of the second timer.

After creation of the allowed list, the MME 130 processes the attach request of the MTC terminal 110 using a specified procedure (S435). The MME 130 sends an attach accept message to the MTC terminal 110 (S440). Here, the attach accept message may contain the allowed list created by the MME 130.

The above steps are related to dynamic creation of an allowed list at initial network attachment or initial deployment of the MTC terminal 110.

Later, when the MTC terminal 110 is moved to another site or the eNBs 120 are rearranged, it is necessary to update the allowed list. Therefore, the present invention provides a mechanism for periodically updating the allowed list.

When the MTC terminal 110 enters idle mode, it collects information regarding available cells for a preset time (periodic tracking area update time), and creates an ECGI list, entries of which are arranged in order of signal strength (S445).

The MTC terminal 110 sends a tracking area update request to the eNB 120 (S450). Here, the tracking area update request may contain the ECGI list created at step S445.

The eNB 120 sends the tracking area update request, the TAI and ECGI of the eNB 120, and the ECGI list to the MME 130 (S455).

The MME 130 updates the allowed list on the basis of the ECGI list from the MTC terminal 110 (S460). At this step, the MME 130 adds ECGIs of the ECGI list to the allowed list up to the maximum permitted number of cells (maximum) on the basis of signal strengths and measurement times attached to ECGIs.

How the MME 130 updates the allowed list is described below with reference to Table 1.

TABLE 1 max num = 2 allowed list update rule = ECGI that is present in both the existing allowed list and the new ECGI list from the terminal has the highest priority; and ECGIs present only in the new ECGI list have priorities in order of signal strengths.

| Time | Newly received list | Allowed list |
|---|---|---|
| First (at initial attachment) | (ECGI 1, signal strength = 100)(ECGI 2, signal strength = 30) | (ECGI 1, signal strength = 100)(ECGI 2, signal strength = 30) |
| Second (at first reception of TAU) | (ECGI 2, signal strength = 20)(ECGI 4, signal strength = 100) | (ECGI 2, signal strength = 20)(ECGI 4, signal strength = 100) |
| Third (at second reception of TAU) | (ECGI 2, signal strength = 60)(ECGI 1, signal strength = 20) | (ECGI 2, signal strength = 60)(ECGI 1, signal strength = 20) |

Referring to Table 1, at the first time, to accept initial network attachment, the MME 130 creates the allowed list whose entries are identical to those of the ECGI list received from the MTC terminal 110. At the second time, the MME 130 compares the allowed list created at the first time with the ECGI list received at this time, and updates the allowed list to include "ECGI 2" (common in the two lists) and "ECGI 4" (higher signal strength in the new ECGI list). At the third time, the MME 130 compares the allowed list updated at the second time with the ECGI list received at this time, and updates the allowed list so that it contains "ECGI 2" (present in both lists) and "ECGI 1" (remaining entry in the new ECGI list).

The MME 130 is not limited to the above allowed list update rule and different rules may be used to update the allowed list as necessary.

Referring back to FIG. 4, when entries of the allowed list are changed owing to allowed list update, the MME 130 sends the updated allowed list to the MTC terminal 110 (S465). At this step, the MME 130 may send a tracking area update accept message containing the updated allowed list to the MTC terminal 110.

On the other hand, when the first timer expires, the MTC terminal 110 stops inserting the ECGI list to the tracking area update request (S470*a*). When the second timer expires, the MME 130 stops updating the allowed list (S470*b*).

After stopping update of the allowed list, the MME 130 stores the allowed list at the HSS 140 by sending an update location request containing the allowed list to the HSS 140 (S475). The HSS 140 stores the updated allowed list and sends an update location acknowledgment message to the MME 130 (S480).

Figure 5:
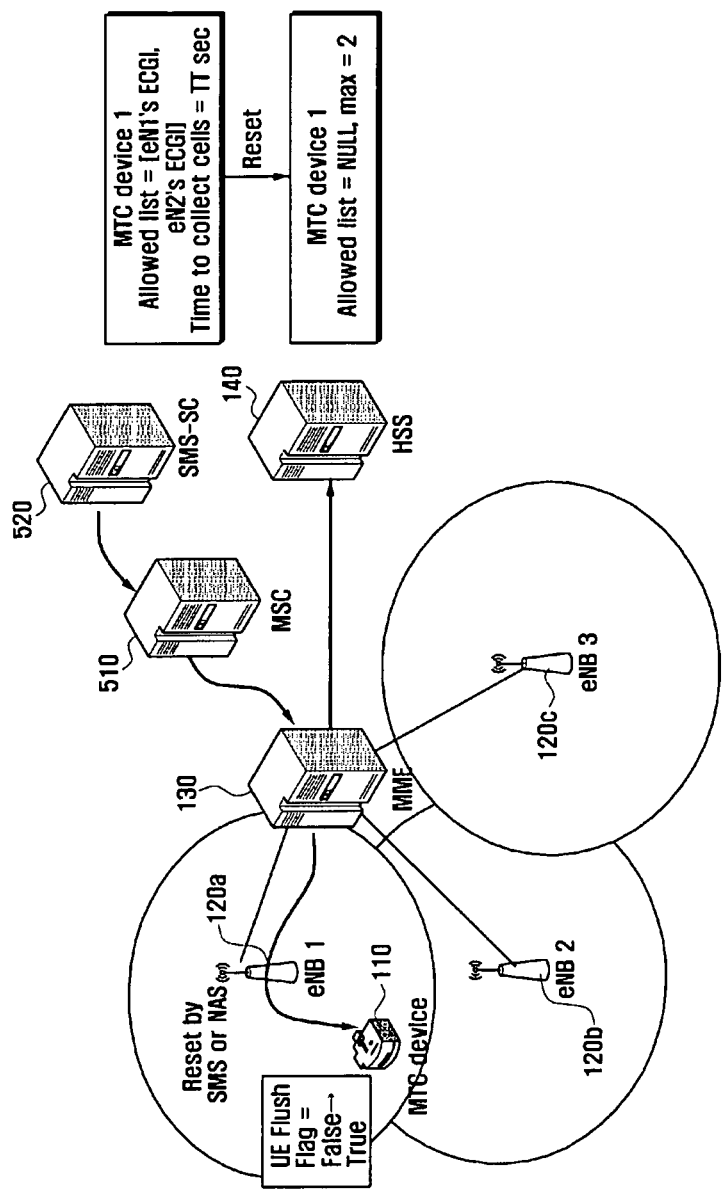
FIG. 5 is a diagram depicting a procedure for resetting a created allowed list.

FIG. 5 is a diagram depicting a procedure for resetting an existing allowed list.

When cells are adjusted because of network rearrangement after an allowed list is generated according to the procedure of FIGS. 3 and 4, it is necessary to reinitialize the allowed list.

To achieve this, the network operator initializes the allowed list stored in the HSS 140 (allowed list=NULL), and sends an initialization indicator (UE flush flag reset indicator) to the MTC terminal 110 using an SMS (short message service) message or a NAS signaling message (attach accept or tracking area accept). In response to the initialization indicator, the MTC terminal 110 initializes the allowed list (UE flush flag=True).

After initialization of the allowed list, the MTC terminal 110 may regenerate the allowed list by performing the procedure of FIGS. 3 and 4.

Second Embodiment

In the second embodiment, the MME 130 creates the allowed list and sends the completed allowed list to the HSS 140.

The MME 130 creates the allowed list by collecting the ECGIs of the cells, which forward control messages of the MTC terminal 110 to the MME 130, for a preset time (period to collect cells) stored in the subscription information.

Figure 6:
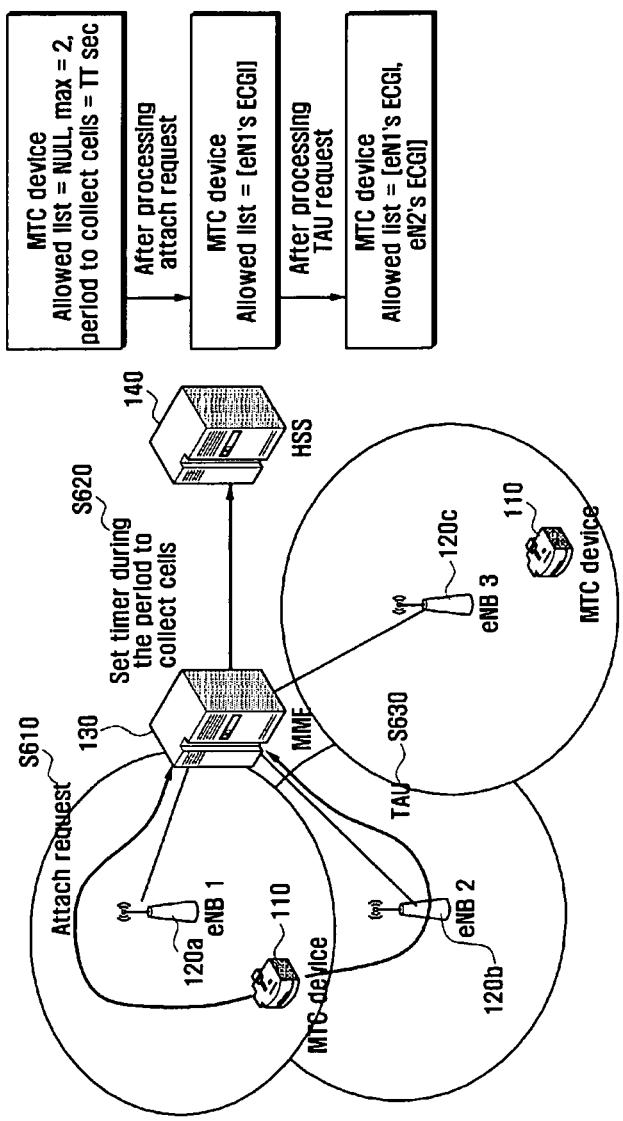
FIG. 6 is a diagram depicting an access control method using an allowed list created by the MME according to a second embodiment of the present invention.

FIG. 6 is a diagram depicting an access control method using an allowed list created by the MME 130 according to the second embodiment of the present invention.

Referring to FIG. 6, the MTC terminal 110 sends an attach request via the eNB 120*a* to the MME 130 (S610). The MME 130 adds the identifier of the cell ("ECGI 1"), which forwards the control message (i.e., initial UE message) of the MTC terminal 110, to the allowed list (S620).

Later, the MTC terminal 110 sends a tracking area update request via the eNB 120*b* to the MME 130 (S630). The MME 130 adds the identifier of the cell ("ECGI 2"), which forwards the control message (i.e., tracking area update request) of the MTC terminal 110, to the allowed list (S620).

Figure 7:
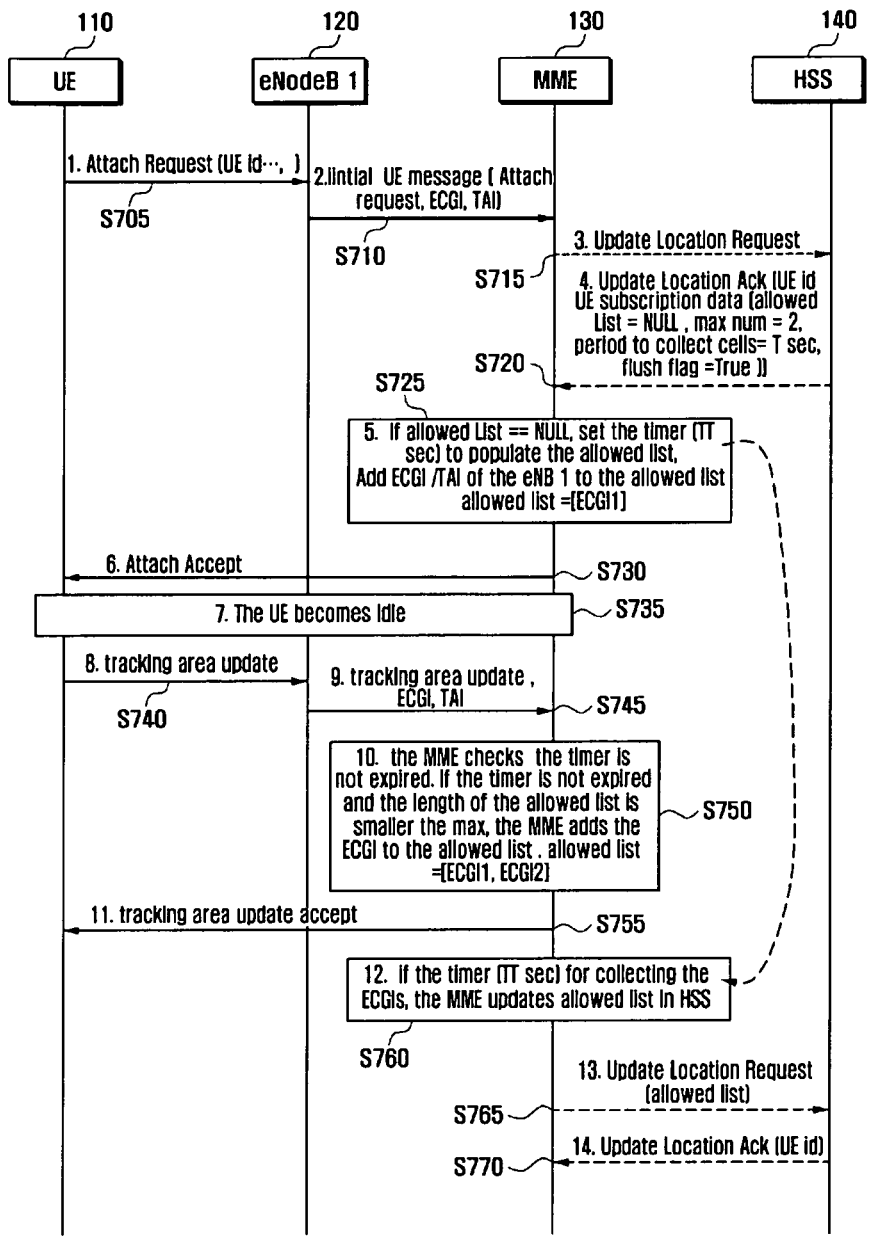
FIG. 7 is a sequence diagram illustrating a procedure in which the MME creates an allowed list, sends the same to the HSS, and updates the allowed list according to the embodiment of FIG. 6.

FIG. 7 is a sequence diagram illustrating a procedure in which the MME 130 creates an allowed list, sends the same to the HSS 140, and updates the allowed list according to the second embodiment.

Referring to FIG. 7, for network access, the MTC terminal 110 sends an attach request to the eNB 120*a* (S705). The eNB 120*a* creates an initial UE message and sends the same to the MME 130 (S710). Here, the initial UE message may contain the attach request from the MTC terminal 110 and the ECGI and TAI of the cell forwarding the attach request.

Upon reception of the initial UE message from the eNB 120*a*, the MME 130 sends a request for subscription information of the MTC terminal 110 to the HSS 140 (S715). In return, the HSS 140 sends the initialized allowed list (allowed list=NULL) and the time to collect cell information (TT) to the MME 130 (S720).

When the received allowed list is empty (or initialized), the MME 130 starts a timer running for the time to collect cell information (TT) to fill the allowed list (S725). At the same time, the MME 130 adds the identifier ("ECGI 1") of the cell having transmitted the attach request first to the allowed list. This serves to secure network access of the MTC terminal 110 requesting initial attachment. The MME 130 sends an attach accept message to the MTC terminal 110 (S730).

As described before in the first embodiment, after generation of the allowed list, when the MTC terminal 110 is moved to another site or the eNBs 120 are rearranged, it is necessary to update the allowed list. Therefore, the second embodiment also provides a mechanism for periodically updating the allowed list.

As the MTC terminal 110 enters the idle mode (S735), it sends a tracking area update request to the eNB 120*b* (S740). The eNB 120*b* sends the tracking area update request, and the TAI and ECGI ("ECGI 2") of the cell managed by the eNB 120*b* to the MME 130 (S745).

Upon reception of the tracking area update request, the MME 130 checks whether the time to collect cell information (TT) has expired (S750). When the time to collect cell information (TT) has not expired, the MME 130 updates the allowed list using the ECGI of the cell forwarding the tracking area update request. A rule for allowed list update is described in connection with Table 1. After updating the allowed list, the MME 130 sends a tracking area update accept message to the MTC terminal 110 (S755).

When the time to collect cell information (TT) has expired, the MME 130 determines to update the existing allowed list stored in the HSS 140 (S760), and sends an update location request containing the created or updated allowed list to the HSS 140 (S765). In return, the HSS 140 sends an update location acknowledgment message to the MME 130 (S770).

Figure 8:
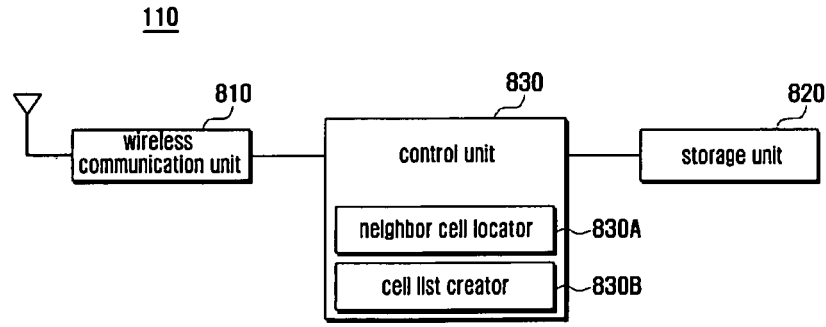
FIG. 8 is a block diagram of an MTC terminal according to another embodiment of the present invention.

FIG. 8 is a block diagram of the MTC terminal 110 according to another embodiment of the present invention. As shown in FIG. 8, the MTC terminal 110 may include a wireless communication unit 810, a storage unit 820, and a control unit 830. The control unit 830 may include a neighbor cell locator 830A and a cell list creator 830B.

The wireless communication unit 810 sends and receives data for wireless communication of the MTC terminal 110. The wireless communication unit 810 may include a radio frequency transmitter for upconverting the frequency of a signal to be transmitted and amplifying the signal, and a radio frequency receiver for low-noise amplifying a received signal and downconverting the frequency of the signal. The wireless communication unit 810 may receive data through a wireless channel and forward the received data to the control unit 830, and may transmit data from the control unit 830 through the wireless channel.

The storage unit 820 stores programs and data necessary for the operation of the MTC terminal 110, and may include a program area and a data area. In particular, the storage unit 820 may store information items for creating the allowed list, such as network detachment indication (UE Flush Flag=True), the time to collect information on neighbor cells available at initial attachment (t), and the tracking area update time (TT).

The control unit 830 controls the overall operation of the MTC terminal 110.

Particularly in the first embodiment, the control unit 830 controls an operation to collect information regarding available cells at initial attachment and to send the collected cell information to the MME 130. To achieve this, the control unit 830 may include a neighbor cell locator 830A and a cell list creator 830B.

The neighbor cell locator 830A searches for available cells for a preset time t at initial network attachment. The cell list creator 830B generates a cell list (ECGI list) in order of signal strength using the search results. The generated cell list is sent to the MME 130, which generates the allowed list on the basis of the cell list.

For allowed list update, when the MTC terminal 110 enters the idle mode, the neighbor cell locator 830A and the cell list creator 830B generate a cell list and send the generated cell list to the MME 130 at regular intervals.

In the second embodiment, like a standard terminal, the MTC terminal 110 sends and receives only control signals to and from the eNB 120 or the MME 130. Hence, the control unit 830 does not have to include the neighbor cell locator 830A and the cell list creator 830B in the second embodiment.

Figure 9:
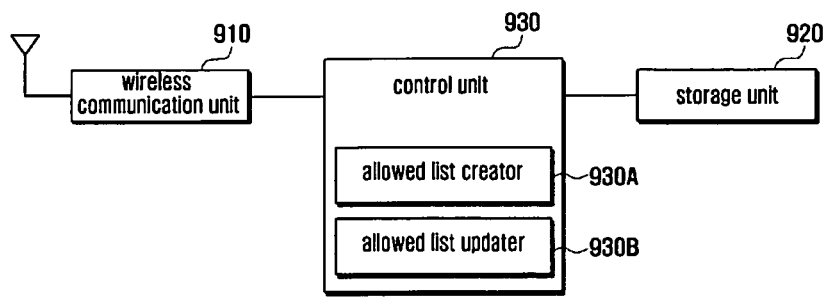
FIG. 9 is a block diagram of the MME according to another embodiment of the present invention.

FIG. 9 is a block diagram of the MME 130 according to another embodiment of the present invention. As shown in FIG. 9, the MME 130 may include a wireless communication unit 910, a storage unit 920, and a control unit 930. The control unit 930 may include an allowed list creator 930A and an allowed list updater 930B.

The wireless communication unit 910 sends and receives data for wireless communication of the MME 130. The wireless communication unit 910 may include a radio frequency transmitter for upconverting the frequency of a signal to be transmitted and amplifying the signal, and a radio frequency receiver for low-noise amplifying a received signal and downconverting the frequency of the signal. The wireless communication unit 910 may receive data through a wireless channel and forward the received data to the control unit 930, and may transmit data from the control unit 930 through the wireless channel.

The storage unit 920 stores programs and data necessary for the operation of the MME 130. In particular, the storage unit 920 may temporarily store a created allowed list.

The control unit 930 controls the overall operation of the MME 130. In particular, to generate and update an allowed list for the MTC terminal 110, the control unit 930 may include an allowed list creator 930A and an allowed list updater 930B.

In the first embodiment, when the allowed list received from the HSS 140 is initialized, the allowed list creator 930A first adds the ECGI of the cell having transmitted an attach request of the MTC terminal 110 to the allowed list. Next, the allowed list creator 930A adds items (i.e., ECGIs) of the ECGI list from the MTC terminal 110 to the allowed list up to the maximum permitted number of cells set in the subscription information.

The allowed list updater 930B periodically receives a cell list from the MTC terminal 110, and compares the existing allowed list with the newly received cell list to update the allowed list using a preset rule. A rule for allowed list update is described in connection with Table 1.

In the second embodiment, when the allowed list received from the HSS 140 is initialized, the allowed list creator 930A first adds the ECGI of the cell having transmitted an attach request of the MTC terminal 110 to the allowed list.

The allowed list updater 930B updates, upon reception of a tracking area update request of the MTC terminal 110, the allowed list by adding the ECGI of the cell having transmitted the tracking area update request to the allowed list using a preset rule. A rule for allowed list update is described in connection with Table 1.

As apparent from the above description, the allowed list, which stores information regarding regions at which the MTC terminal 110 is permitted to access the network, may be dynamically created by the MTC terminal 110 or the MME 130.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

The invention claimed is:

1. A method for generating an allowed list by a terminal, the method comprising:
   obtaining first information on one or more available cells;
   generating a first cell list based on the first information;
   transmitting an attach request message including the first cell list to a base station; and
   receiving an attach accept message including an allowed list from the base station,
   wherein the allowed list is generated by a mobility management entity (MME) by adding the first information of the first cell list generated by the terminal to an initialized allowed list received from a home subscriber server (HSS) based on a predetermined number of cells configured by subscriber information of the terminal.

2. The method of claim 1, further comprising:
obtaining, second information on one or more available cells during a period if the terminal is in an idle mode;
generating a second cell list based on the second information;
transmitting a first message including the second cell list to the base station; and
receiving a second message including an updated allowed list from the base station,
wherein the second cell list is used to update the allowed list by the MME.

3. A method for generating an allowed list by a base station, the method comprising:
receiving an attach request message including a first cell list based on first information on one or more available cells to be detected by a terminal from the terminal;
transmitting the attach request message including the first cell list to a mobility management entity (MME);
receiving an attach accept message including the allowed list from the MME; and
transmitting the attach accept message including the allowed list to the terminal,
wherein the allowed list is generated by the MME by adding the first information of the first cell list generated by the terminal to an initialized allowed list received from a home subscriber server (HSS) based on a predetermined number of cells configured by subscriber information of the terminal.

4. The method of claim 3, wherein the attach request message further comprises a cell identifier of the base station.

5. The method of claim 3, further comprising:
receiving a first message including a second cell list based on second information on one or more available cells to be detected by the terminal during a period, if the terminal is in an idle mode, from the terminal;
transmitting the first message and a cell identifier of the base station to the MME;
receiving a second message including an updated allowed list from the MME; and
transmitting the second message to the terminal,
wherein the second cell list is used to update the allowed list by the MME.

6. A method for generating an allowed list by a Mobility Management Entity (MME), the method comprising:
receiving an attach request message including a cell identifier of a base station and a first cell list based on first information on one or more available cells to be detected by the terminal from the base station;
receiving an initialized allowed list from a home subscriber server (HSS);
generating the allowed list by adding the cell identifier of the base station having transmitted the attach request message and at least one cell identifier included in the first cell list generated by the terminal to the initialized allowed list up to a predetermined number of cell identifiers configured by subscriber information of the terminal; and
controlling the network access of the terminal on the basis of the allowed list.

7. The method of claim 6, further comprising transmitting an attach accept message including the allowed list to the terminal.

8. The method of claim 6, wherein the cell identifier of the base station having transmitted the attach request message is added first to the allowed list.

9. The method of claim 7, further comprising:
receiving a first message including a second cell list based on second information on one or more available cells to be detected by the terminal during a period if the terminal is in an idle mode and a cell identifier of the base station from the base station;
updating the allowed list based on the second cell list; and
transmitting, if the allowed list is updated, a second message including the updated allowed list to the terminal.

10. The method of claim 9, further comprising storing, if the updating of the allowed list is stopped, the updated allowed list at the HSS by transmitting a third message including the updated allowed list to the HSS.

11. The method of claim 7, further comprising:
receiving a fourth message indicating that the allowed list of the HSS is initialized from the HSS; and
transmitting a fifth message for the terminal to initialize the allowed list of the terminal.

12. A terminal for generating an allowed list, the terminal comprising:
a transceiver configured to transmit and receive a signal; and
a controller configured to control to obtain first information on one or more available cells to be detected by the terminal, to generate a first cell list based on the first information, to transmit an attach request message including the first cell list to a base station, and to receive an attach accept message including the allowed list from the base station,
wherein the allowed list is generated by a mobility management entity (MME) by adding the first information of the first cell list generated by the terminal to an initialized allowed list received from a home subscriber server (HSS) based on a predetermined number of cells configured by subscriber information of the terminal.

13. The terminal of claim 12, wherein the controller is further configured to obtain second information on one or more available cells during a period if the terminal is in an idle mode, to generate a second cell list based on the second information, to transmit a first message including the second cell list to the base station, and to receive a second message including the updated allowed list from the base station, and
wherein the second cell list is used to update the allowed list by the MME.

14. A base station for generating an allowed list, the base station comprising:
a transceiver configured to transmit and to receive a signal; and
a controller configured to receive an attach request message including a first cell list based on first information on one or more available cells to be detected by the terminal from the terminal, to transmit the attach request message including the first cell list to a mobility management entity (MME), to receive an attach accept message including the allowed list from the MME, and to transmit the attach accept message including the allowed list to the terminal,
wherein the allowed list is generated by the MME by adding the first information of the first cell list generated by the terminal to an initialized allowed list received from a home subscriber server (HSS) based on a predetermined number of cells configured by subscriber information of the terminal.

15. The base station of claim 14, wherein the attach request message further comprises a cell identifier of the base station.

16. The base station of claim 14, wherein the controller is further configured to receive a first message including a second cell list based on second information on one or more available cells to be detected by the terminal during a period, if the terminal is in an idle mode, from the terminal, to transmit the first message and a cell identifier of the base station to the MME, to receive a second message including an updated allowed list from the MME, and to transmit the second message to the terminal, and wherein the second cell list is used to update the allowed list by the MME.

17. A mobility management entity (MME) for generating an allowed list, the MME comprising:

a transceiver configured to transmit and receive a signal; and a controller configured to control to receive an attach request message including a cell identifier of a base station and a first cell list based on first information on one or more available cells to be detected by the terminal from the base station, to receive an initialized allowed list from a home subscriber server (HSS), to generate the allowed list by adding the cell identifier of the base station having transmitted the first message and at least one cell identifier included in the attach request cell list generated by the terminal to the initialized allowed list up to a predetermined number of cell identifiers configured by subscriber information of the terminal, and to control the network access of the terminal on the basis of the allowed list.

18. The MME of claim 17, wherein the controller is further configured to transmit an attach accept message including the allowed list to the terminal.

19. The MME of claim 17, wherein the cell identifier of the base station having transmitted the attach request message is added first to the allowed list.

20. The MME of claim 18, wherein the controller is further configured to control to receive a first message including a second cell list based on second information on one or more available cells to be detected by the terminal during a period, if the terminal is in an idle mode, and a cell identifier of the base station from the base station, to update the allowed list based on the second cell list, and to transmit, if the first cell list of the allowed list is changed owing to an allowed list update, a second message including the updated allowed list to the terminal.

21. The MME of claim 20, wherein the controller is further configured to control to store, if the updating of the allowed list is stopped, the updated allowed list at the HSS by transmitting a third message including the updated allowed list to the HSS.

22. The MME of claim 18, wherein the controller is further configured to control to receive a fourth message indicating that the allowed list of the HSS is initialized from the HSS, and to transmit a fifth message for the terminal to initialize the allowed list of the terminal.

* * * * *